US006212360B1

(12) United States Patent
Fleming, III et al.

(10) Patent No.: US 6,212,360 B1
(45) Date of Patent: Apr. 3, 2001

(54) METHODS AND APPARATUS FOR CONTROLLING EARTH-STATION TRANSMITTED POWER IN A VSAT NETWORK

(75) Inventors: Robert F. Fleming, III, Derwood, MD (US); William A. Check, Great Falls, VA (US); Joseph A. Chisholm, Manassas, VA (US); Brian J. Glinsman, Herndon, VA (US); David B. Kim, Great Falls, VA (US); Ronald L. Kronz, Fairfax, VA (US)

(73) Assignee: GE Capital Spacenet Services, Inc., McLean, VA (US)

( * ) Notice: Subject to any disclaimer, the term of this patent is extended or adjusted under 35 U.S.C. 154(b) by 0 days.

(21) Appl. No.: 09/050,972

(22) Filed: Mar. 31, 1998

Related U.S. Application Data

(60) Provisional application No. 60/042,835, filed on Apr. 9, 1997.

(51) Int. Cl.[7] .................................................. H04B 7/185
(52) U.S. Cl. ........................ 455/13.4; 455/427; 455/232.1
(58) Field of Search .................................. 342/358, 352; 455/10, 12.1, 13.4, 13.2, 427, 466, 68, 232.1; 370/320; 375/202

(56) References Cited

U.S. PATENT DOCUMENTS

| 4,004,224 | * | 1/1977 | Arens et al. ............................ 325/2 |
|---|---|---|---|
| 4,567,485 | * | 1/1986 | Oshima et al. ...................... 343/358 |
| 4,697,187 | * | 9/1987 | Ohno et al. .......................... 342/358 |
| 4,731,866 | * | 3/1988 | Muratani et al. ........................ 455/9 |
| 4,752,967 | * | 6/1988 | Bustamante et al. ................... 455/12 |
| 4,896,369 | * | 1/1990 | Adams, Jr. et al. .................... 455/12 |
| 4,941,199 | * | 7/1990 | Saam ..................................... 455/10 |
| 5,060,292 | * | 10/1991 | Ayukawa et al. ...................... 455/52 |
| 5,257,029 | * | 10/1993 | Miyo .................................... 342/352 |
| 5,606,551 | * | 2/1997 | Kartalopoulos ...................... 370/406 |
| 5,619,525 | * | 4/1997 | Wiedeman et al. .................. 375/200 |
| 5,708,966 | * | 1/1998 | Al-Dhahir et al. ................. 455/13.4 |
| 5,787,336 | * | 7/1998 | Hirschfield et al. ............... 455/13.4 |

* cited by examiner

Primary Examiner—William G. Trost
Assistant Examiner—Charles Craver
(74) Attorney, Agent, or Firm—Jones Volentine, L.L.C.

(57) ABSTRACT

A method is shown for providing stable communication between a hub earth-station and a VSAT earth-station by regulating the power of signals transmitted via a satellite. In this method, the hub receives a beacon signal from the satellite and a previous outbound signal. The hub then regulates the power of an outbound signal transmitted by the hub to VSAT via the satellite, based on either the beacon signal or the previous outbound signal. The hub then sends a current outbound signal, including signal data and parameter data to the VSAT via the satellite. The VSAT receives the current outbound signal and determines a number of signal properties pertaining to the current outbound signal. The VSAT then regulates the power of an inbound signal transmitted by the VSAT to the hub via the satellite, based on the signal properties, the parameter data, and a set of reference data.

10 Claims, 6 Drawing Sheets

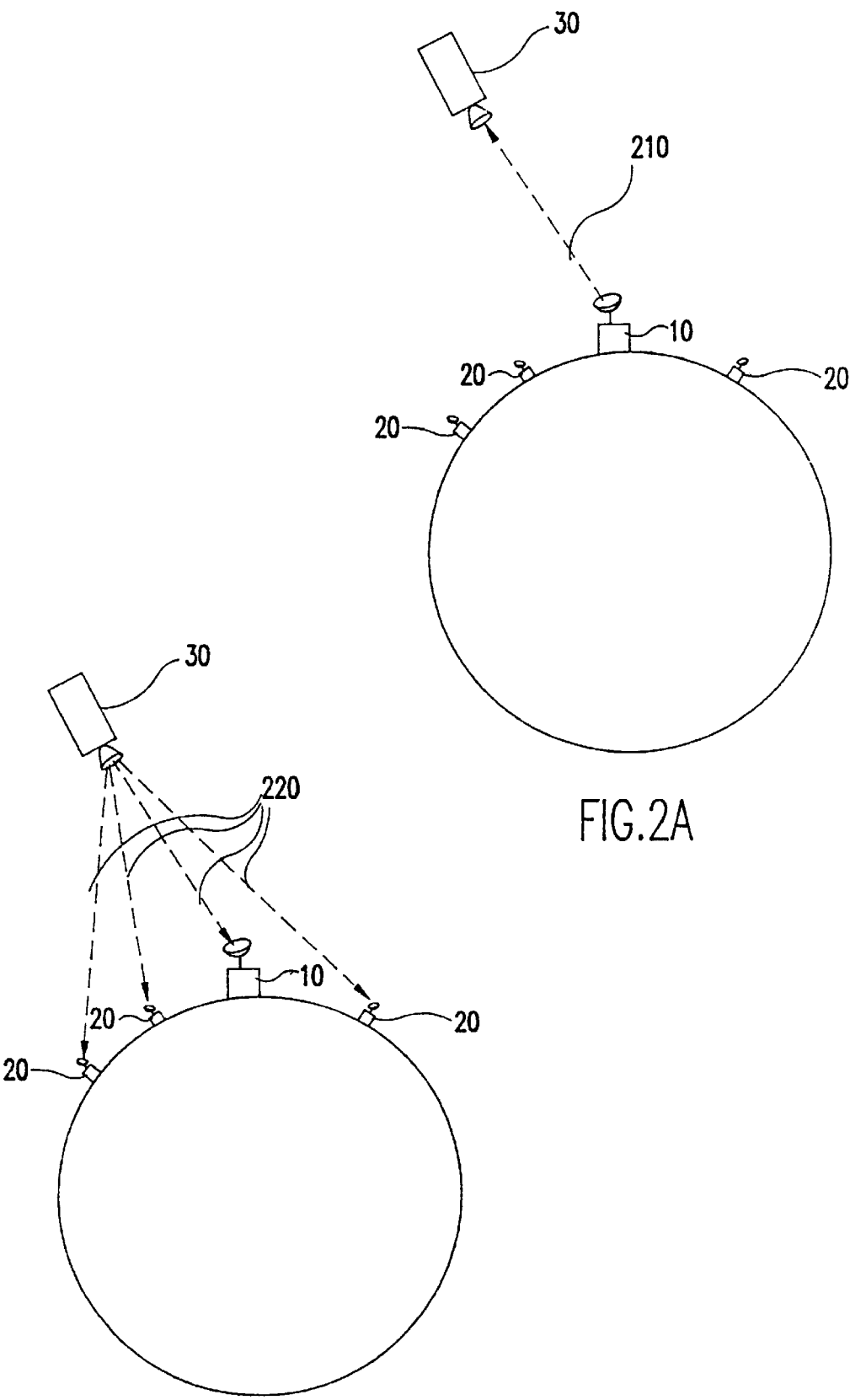

METHODS AND APPARATUS FOR CONTROLLING EARTH-STATION TRANSMITTED POWER IN A VSAT NETWORK

This application claims the benefit of U.S. Provisional Application No. 60/042,835 filed Apr. 9, 1997.

BACKGROUND OF THE INVENTION

1. Field of the Invention

The present invention pertains to the field of satellite communications. More particularly, the present invention relates to satellite-communication networks comprising a master earth-station and a number of remote earth-stations. In particular, this invention pertains to the control of the signal power level transmitted by the earth-stations in such networks.

2. Description of the Related Art

FIG. 1 shows a conventional very small aperture terminal (VSAT) satellite-communication network. The VSAT network comprises a master earth-station, referred to herein as a "hub" 10, a number of remote earth-stations, referred to herein as "VSATs" 20, and a geostationary communication satellite transponder, referred to herein as a "satellite" 30. The hub 10 communicates with the VSATs and the VSATs 20 communicate with the hub 10 by sending transmission signals 40 through the satellite 30.

FIGS. 2A through 2D illustrates the operation of the conventional VSAT satellite communication network of FIG. 1. As these figures show, the communication between the hub 10 and the VSATs 20 is accomplished through the use of an outbound transmission signal from the hub 10 to the VSATs 20, and an inbound transmission signal from the VSATs 20 to the hub 10.

FIGS. 2A and 2B illustrate an outbound transmission signal from the hub 10 to a VSAT 20. As shown in FIG. 2A, the outbound transmission signal first includes an outbound uplink portion 210, passing from the hub 10 to the satellite 30. As shown in FIG. 2B, the outbound transmission signal also includes an outbound downlink portion 220, passing from the satellite 30 to the hub 10 and all VSATs 20.

FIGS. 2C and 2D illustrate an inbound transmission signal from a VSAT 20 to the hub 10. As shown in FIG. 2C, the inbound transmission signal first includes an inbound uplink portion 230, passing from a VSAT 20 to the satellite 30. As shown in FIG. 2D, the inbound transmission signal also includes an inbound downlink portion 240, passing from the satellite 30 to the hub 10.

The outbound transmission signal 210 and 220 is a continuous signal sent from the hub 10. In contrast, the inbound transmission signal 230 and 240 is sent in bursts as needed by the various VSATs 20.

Satellite transponder resources are sold and leased in units of power and bandwidth. A VSAT network operator must carefully control both resources in order to achieve economical operation.

Code-division multiple-access (CDMA) is a multiple-access technique that forms the basis for the IS-95 digital cellular telephony standard, and has some important advantages for use in VSAT networks, particularly when it is important to be able to use small antennas at the remote terminals. The first widely-deployed VSAT networks using CDMA used the C200 product developed by Equatorial Communications Company (ECC) of Mountain View, Calif.

It is widely recognized that accurate power control is required to equalize the received power levels of signals multiplexed on a channel using the CDMA technique to maximize the operational efficiency of the network. Qualcomm, Inc. has developed a number of power control techniques for use in the CDMA cellular telephony networks that they have developed based on the IS-95 standard. Qualcomm's techniques are designed for terrestrial networks that operate without a satellite relay, and are designed to cope with the rapid fading that occurs in a mobile terrestrial microwave propagation environment.

Operational experience with the ECC C200 networks also showed the need for accurate power control of the VSAT transmitters. The C200 product was limited by the fact that the control of the VSATs' inbound (VSAT-to-hub) transmitted power levels had to be accomplished by manual intervention of an operator at the hub. Since the C200 system was primarily designed for C-Band operation, the rapid fading that occurs at higher frequencies due to rain was not a serious problem for the system. However, VSAT networks based on this product typically required periodic expert rebalancing of the inbound power levels across the network to compensate for gradual changes in the equipment or haphazard adjustments by inexperienced operators.

For VSAT networks operating at Ku-Band and higher frequencies, rain fade is a serious problem. Rain fade results from the absorption and scattering of the transmission signals 40 between the hub 10 and satellite 30 and between the VSATs 20 and the satellite 30 by water droplets or ice crystals in the atmosphere. During rain fade, changes in attenuation and hence the received signal level can occur within a few seconds. At Ku-Band and higher frequencies, rapid and automatic uplink power control becomes very important.

Uplink power control has typically been implemented only on the outbound (hub-to-VSAT) link, where the additional cost of the equipment at the hub is of minor consequence. A rain fade affecting the outbound uplink (a rain fade between the hub 10 and the satellite 30) affects the entire network, while a rain fade on the inbound uplink (a rain fade between a VSAT 20 and the satellite 30) only affects that VSAT 20. Standard practice has been to operate the VSATs 20 with enough inbound (VSAT-to-hub) power to overcome most rain fades.

For CDMA VSAT operation at Ku-Band and higher frequencies, however, uplink power control on the inbound signal becomes a necessity. Uplink power control can also benefit TDMA and other modes of satellite access operation by providing the network operator the ability to control and thus reduce his transponder power requirement, by only operating the VSAT transmitter at high power levels when required to overcome rain fades.

SUMMARY OF THE INVENTION

It is an object of this invention to provide methods and apparatus for precisely and accurately controlling the power levels of both the hub earth station and the VSAT transmitters in a VSAT network.

It is another object of this invention to provide power control methods and apparatus that take into account the specific effects of the satellite transponder relay between the hub and the VSATs.

It is yet another object of this invention to provide power control mechanisms for both the outbound and the inbound links in a VSAT network that respond rapidly to changes in the atmospheric attenuation between the earth stations and the satellites.

It is still another object of this invention to provide power control mechanisms that include checks against long-term creep in the inbound power level settings of the VSATs in a VSAT network.

It is a further object of this invention to provide multiple independent means of determining whether and when the power level of an individual VSAT transmitter should be adjusted to maintain its link performance close to a setpoint.

It is a still further object of this invention to provide VSAT power control means that facilitate adjustment of the VSAT inbound link performance to take into account the requirements of different types of traffic.

It is also an object of this invention to provide VSAT power control techniques that include the ability to change the link rate to effect a change in the link performance when this cannot be accomplished by adjustments in transmitter power alone.

It is an additional object of this invention to provide power control techniques that take into account the capability of the VSAT transmitter to control its output spectrum.

Therefore, a method is presented for providing stable communication between a hub earth-station and a VSAT earth-station by regulating the power of signals transmitted via a satellite, the method comprising the steps of regulating the power of an outbound signal transmitted by the hub to VSAT via the satellite, based on one of a beacon signal received from the satellite and a previous outbound signal, sending signal information from the hub to the VSAT in the outbound signal, and regulating the power of an inbound signal transmitted by the VSAT to the hub via the satellite, based on properties of the outbound signal and the signal information.

A method is also presented for adjusting the power in an uplink transmission from a hub earth-station to a satellite, the method comprising the steps of receiving an outbound signal from a local receiver, and determining an outbound signal power level, conditionally receiving a beacon signal from a satellite local receiver, and determining a beacon signal power level, computing a first difference between the received beacon signal power level and a nominal beacon signal power level, when the beacon signal is received, computing a second difference between the received outbound signal power level and a nominal outbound signal power level, when the beacon signal is not received, computing a desired amount of attenuation based on the first difference if the beacon signal is received and the second difference if the beacon signal is not received.

A method is also provided for regulating the power of an inbound signal sent from a VSAT earth-station to a hub earth-station, the method comprising the steps of receiving an outbound signal sent from the hub earth-station to the VSAT earth-station, the outbound signal including signal data and parameter data, determining signal properties of the received outbound signal, and modifying the inbound transmission signal based on the parameter data, the signal properties, and reference data.

BRIEF DESCRIPTION OF THE DRAWINGS

The above and other objects and advantages of the present invention will become readily apparent from the description that follows, with reference to the accompanying drawings, in which:

FIGS. 2A through 2D illustrate the operation of the conventional VSAT satellite communication network of FIG. 1.

DESCRIPTION OF THE PREFERRED EMBODIMENTS

In the present invention, it is necessary to regulate the power of both the outbound signal initially transmitted by the hub 10, and the inbound signal, initially transmitted by the VSAT 20. Since both power outputs are continually regulated, the hub 10 provides additional information to the VSAT 20 to increase the accuracy of its power regulation. The disclosure of the preferred embodiment of the present invention will address these two power regulation schemes separately, first addressing the regulation of power at the hub 10, and then addressing the regulation of power at the VSAT 20.

According to the preferred embodiment, the hub 10 in a VSAT satellite-communication network using Ku-Bands or higher must control the power level of the outbound uplink 210 for three reasons. First, it must overcome hub-to-satellite rain attenuation in order to maintain a sufficient level of the outbound signal for the VSATs 20 to properly receive. Second, it must provide a stable $E_b/N_0$ level of the outbound signal as transmitted by the satellite 30 for the VSATs 20 to use as a reference for inbound uplink power control purposes in determining the satellite-to-VSAT rain fade, where $E_b/N_0$ is the ratio of the received energy per bit to the noise density received by each demodulator. And third, it must avoid exceeding the transponder output power level leased from the satellite operator.

Figure 1:
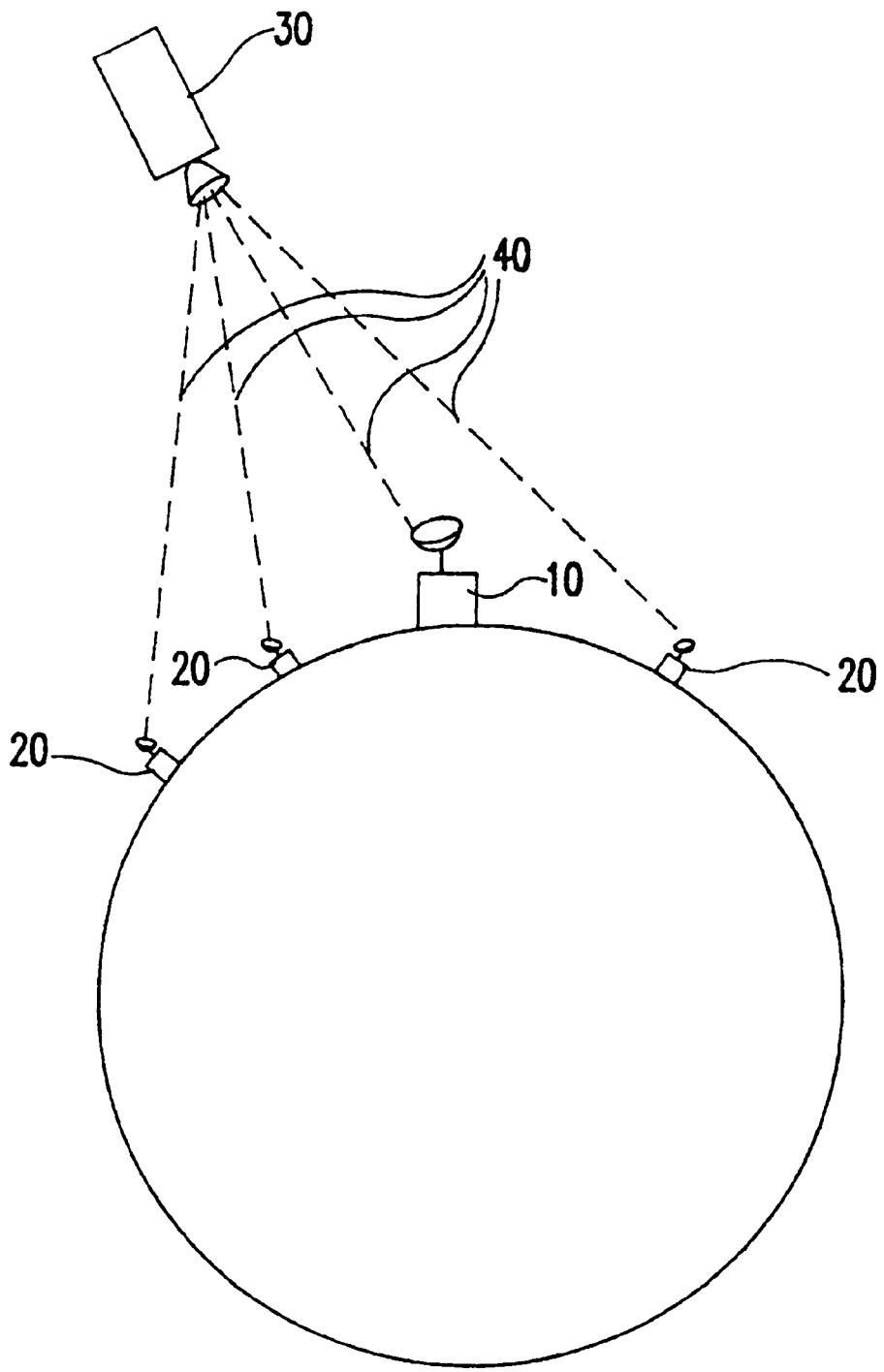
FIG. 1 shows a conventional VSAT satellite-communication network.
Figure 2C:
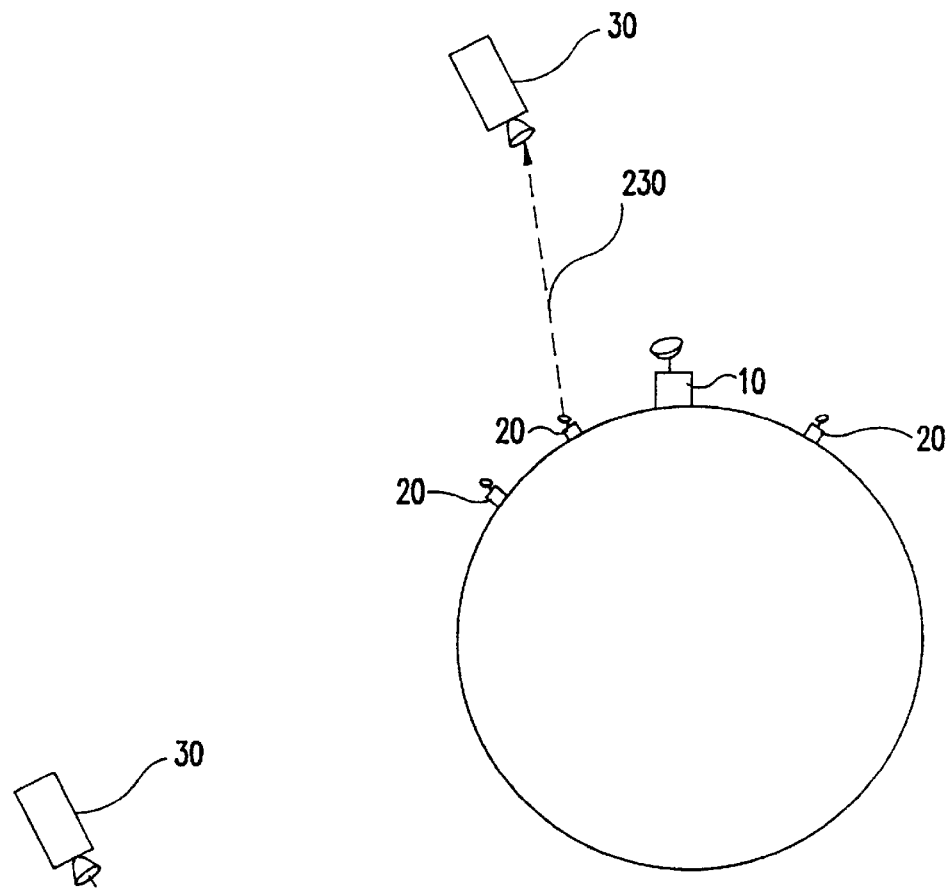
Figure 2D:
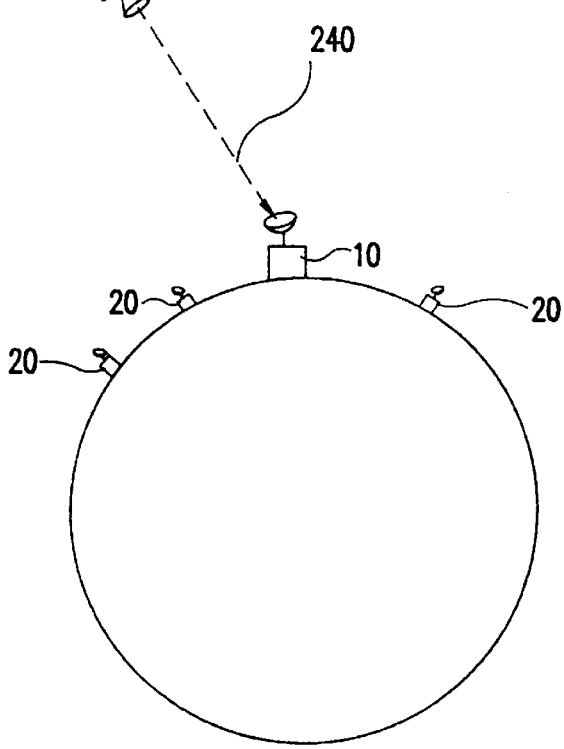
Figure 3:
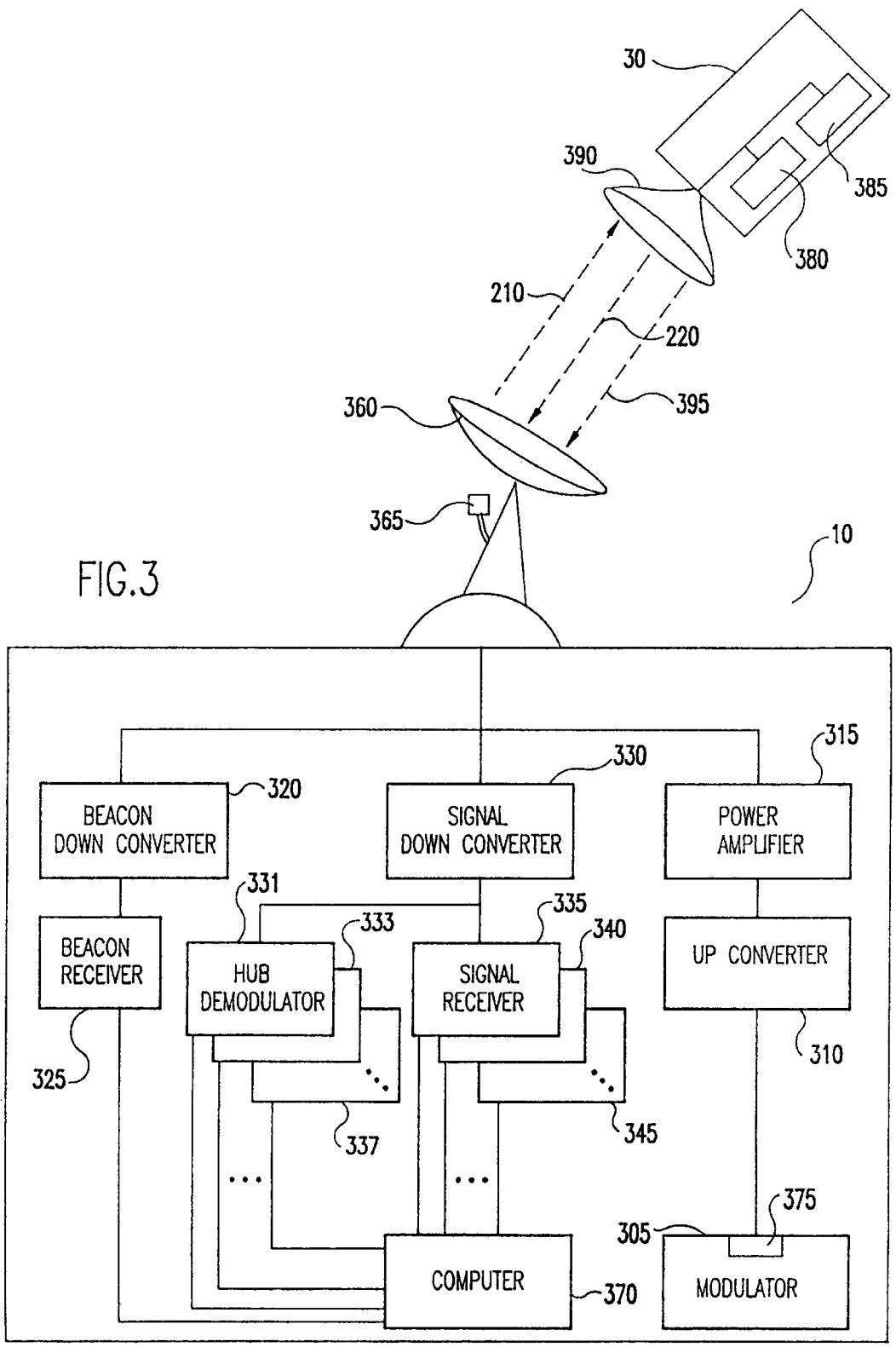
FIG. 3 is a more detailed block diagram of the hub and satellite shown in FIG. 1, according to a preferred embodiment of the present invention.

FIG. 3 is a more detailed block diagram of the hub 10 and satellite 30 shown in FIG. 1, according to a preferred embodiment of the present invention. As shown in FIG. 3, the hub 10 comprises a hub modulator 305, an upconverter 310, a high-power amplifier 315, a beacon downconverter 320, a beacon receiver 325, a signal downconverter 330, first through $n^{th}$ local receivers 335, 340, 345, a hub antenna 360, a computer 370, and first through $n^{th}$ hub demodulators 381, 383, 387. The hub modulator 305 further comprises a hub attenuator 375. The antenna 360 further comprises a low-noise amplifier 365. In the preferred embodiment, there is at least one local receiver at the hub 10 for each outbound signal in the system. In alternate embodiments, using 1-for-1 redundant local receivers, two local receivers are supplied at the hub 10 for each outbound signal in the system. The satellite 30 further comprises a beacon transmitter 380, a signal transponder 385, and a satellite antenna 390.

The hub modulator 305 generates an outbound uplink immediate frequency signal that is converted to Ku-Band by the upconverter 310 and is amplified by the high-power amplifier 315 before being transmitted as a radio-frequency signal by the hub antenna 360 as outbound uplink signal 210. The satellite antenna 390 receives the outbound uplink signal 210 and send it to the signal transponder 385, which performs frequency conversion and amplification of the signal and sends it back to the satellite antenna 390 for transmission as a radio-frequency outbound downlink signal 220.

The hub antenna 360 receives the outbound downlink signal 220 and sends it to the low-noise amplifier 365, which amplifies the outbound downlink signal and sends it to the signal downconverter 330. The signal downconverter 330 converts the outbound downlink signal from a radio-frequency signal to an intermediate-frequency signal that is processed by local receivers 335, 340, 345.

A beacon signal 395 is generated by the beacon transmitter 380 and is transmitted by the satellite antenna 390. The beacon signal 395 is received by the hub antenna 360, is amplified by the low-noise amplifier 365, and is sent to the beacon downconverter 320. The beacon downconverter converts the beacon signal from a radio-frequency signal to an intermediate-frequency signal that is processed by the beacon receiver 325.

It is important to note that signal downconverter 330, beacon downconverter 320, low noise amplifier 365, and beacon transmitter 380 have stable gains and therefore do not contribute significant errors to the power control process.

The hub 10 typically uses the hub attenuator 375 built into the hub modulator 305 to control the outbound power level. The hub modulator 305 will normally be operated in clear sky conditions with at least as much attenuation as the maximum desired rain fade compensation. In other words, if operational parameters require the ability to increase outbound uplink power by up to 6 dB, the hub modulator must operate in clear sky conditions with at least 6 dB of attenuation. This allows for 6 dB of attenuation that can be removed to increase the output power by 6 dB when the skies are not clear.

The hub uplink power control method uses measurements from the beacon receiver 325 of satellite-to-hub rain fade as the primary input to determine how to control the outbound uplink power to overcome a hub-to-satellite rain fade. The beacon receiver 325 provides a measurement of the received signal strength of a signal from the beacon transmitter 385 located on the satellite 30.

The relationship between the rain fade experienced by the beacon signal 395 and the rain fade that is experienced by the outbound uplink signal 210 is a non-linear function of the relative frequencies of the two signals. The relative attenuation A, measured in dB, of two Ku-Band RF signals due to rain in the atmosphere is roughly $$\frac{A_H}{A_L} = k\left(\frac{f_H^2}{f_L^2}\right) = k\left(\frac{f_H}{f_L}\right)^2 \quad (1)$$

where $A_H$ is the attenuation at the higher frequency, where $A_L$ is the attenuation at the lower frequency, where k is a constant between 1.25 and 1.5, where $f_H$ is the higher of the two frequencies, and where $f_L$ is the lower of the two frequencies. This relationship is described in greater detail in the CCIR XIIIth Plenary Assembly, Vol. V, Report 233-3, Geneva, 1974.

In the preferred embodiment, the beacon signal 395 will experience somewhat less attenuation than the outbound uplink signal 210 will, since the outbound uplink signal is typically higher in frequency given the standard Ku-Band geostationary communication satellite frequency plan.

The frequency of the beacon signal 395 is preferably in the range of 10.95 GHz through 12.75 GHz for a Ku-Band system, and the frequency of the outbound uplink signal 210 is preferably in the range of 14 to 14.5 GHz. The square of the ratio of the two frequencies can thus vary considerably, from about 1.21 to about 1.75. The amount of the outbound uplink attenuation is calculated as a function of the actual beacon signal frequency, and the actual outbound uplink frequency, and the beacon fade.

In the preferred embodiment, each of the first through $n^{th}$ local receivers 335 through 345 have the ability to measure and report the outbound power level of the outbound downlink signal 220 received at the hub 10. Measurement by the local receivers 335 through 345 of the outbound signal level provides two functions. One is to enable monitoring of the effect of the outbound power control when a rain fade occurs: each local receiver 335 through 345 measures the same fade on the outbound uplink signal 210 (ignoring frequency differences for the moment) as the beacon receiver 325 measures on the beacon signal 395, as long as uplink power control is functioning correctly. The second function is to serve as an alternative to the beacon receiver beacon measurement, in case the beacon signal 395 goes away.

If the local receiver's measurement of the outbound uplink signal 210 is the only hub rain fade measurement available, the amount of increase in uplink power required can be approximated by recognizing that the total rain fade is equal to the uplink rain fade plus the downlink rain fade, and that the uplink rain fade is higher than the downlink rain fade by the amount given by Eq. (1) above, since the outbound uplink frequency is higher than the outbound downlink frequency. In this case, the total outbound rain fade is given by the equation:

$$F_T = F_D + k\left(\frac{f_{OU}}{f_{OD}}\right)^2 F_D = \left(1 + k\left(\frac{f_{OU}}{f_{OD}}\right)^2\right)F_D \quad (2)$$

where $F_T$ is the total fade measured by the local receiver, where $F_D$ is the amount of the outbound downlink fade, where k is the constant previously discussed, where $f_{OU}$ is the outbound uplink frequency, and where $f_{OD}$ is the frequency of the outbound downlink.

Similarly, the total fade as a function of the uplink fade similarly given by the equation:

$$F_T = F_U + \frac{1}{k}\left(\frac{f_{OD}}{f_{OU}}\right)^2 F_U = \left(1 + \frac{1}{k}\left(\frac{f_{OD}}{f_{OU}}\right)^2\right)F_U \quad (3)$$

where $F_U$ is the amount of the outbound uplink fade, and the rest of the variables are the same as in equation (2).

Thus, the amount of the uplink fade as a function of the total fade, and therefore the increase in the uplink power level required to overcome the fade, $A_U$, is simply $$A_U = \frac{F_T}{1 + \frac{1}{k}\left(\frac{f_{OD}}{f_{OU}}\right)^2} \quad (4)$$

where Au is the amount of outbound attenuation to be removed to compensate for the rain fade.

It is important that the hub 10 not increase its outbound power by more than the amount required to overcome a hub-to-satellite rain fade. This is because the VSATs 20 use the received outbound downlink $E_b/N_0$ level as an input to their own inbound uplink power control method. Otherwise, when the VSATs 20 see the received $E_b/N_0$ increase, they will decrease their power in response, resulting in an increase the block error rates of the inbound signals at the hub demodulators 381, 383, 387. Furthermore, the hub 10 must not transmit at a level higher than that required to achieve the transponder output power level leased from the satellite operator.

A hub-to-satellite rain fade will affect the inbound downlink signals 240 as well as the outbound uplink signal 210. For this reason, in a hub-to-satellite rain fade situation, one might think that it is advantageous to increase the inbound transmitted power level. However, the inbound downlink signal margin is typically 9 dB or more, mitigating the hub-to-satellite rain fade effect on the inbound downlink signal 240. Given these considerations, the hub uplink power control system is designed to not cause the outbound downlink signal transmitted by the satellite 30 to increase during a hub-to-satellite rain fade, and a small amount of fading is permissible, or perhaps even desirable.

It is also important that the downlink outbound signal 220 originating from the satellite 20 not fade by more than one dB or so during a hub-to-satellite rain fade. This, too, is due to the fact that the VSATs 20 use the measured outbound $E_b/N_0$ to control their inbound uplink power. If the VSATs 20 all see an outbound downlink fade, they will raise their inbound power level to compensate. This will reduce their margin to cope with a satellite-to-VSAT rain fade. In addition, it will raise the inbound power spectral density, which is limited by the FCC for antennas that do not meet the beamwidth requirements of Part 25.209 of the FCC Rules.

These two considerations mean that the outbound power control method at the hub 10 needs to maintain better control than has typically been required in the past of VSAT systems. The downlink outbound signal 220 transmitted by the satellite 30 should be maintained within a range of +0, −1 dB of its nominal clear-sky level. This can be accomplished by reducing die factor of k in the uplink power control equation from the range of 1.25 to 1.5 down somewhat, to, say, 1.2, sampling the beacon receiver beacon level measurement and local receiver's outbound level measurements frequently, and updating the hub modulator power level frequently.

The power level of the outbound signal is thus controlled by an outbound transmission signal power level setting method. This method begins by establishing a nominal outbound power level, $P_{nom}$, a nominal beacon receiver level $BR_{nom}$, and a nominal local receiver outbound power level $LR_{nom}$, for clear-sky conditions. The level of $P_{nom}$ in turn determines a hub IF nominal attenuator setting, $A_{nom}$.

The system then adjusts the power level over each of a set of constant sampling intervals $t_{samp}$, where $t_{samp}$ is a system parameter that is preferably set between 1 and 10 seconds.

Figure 4:
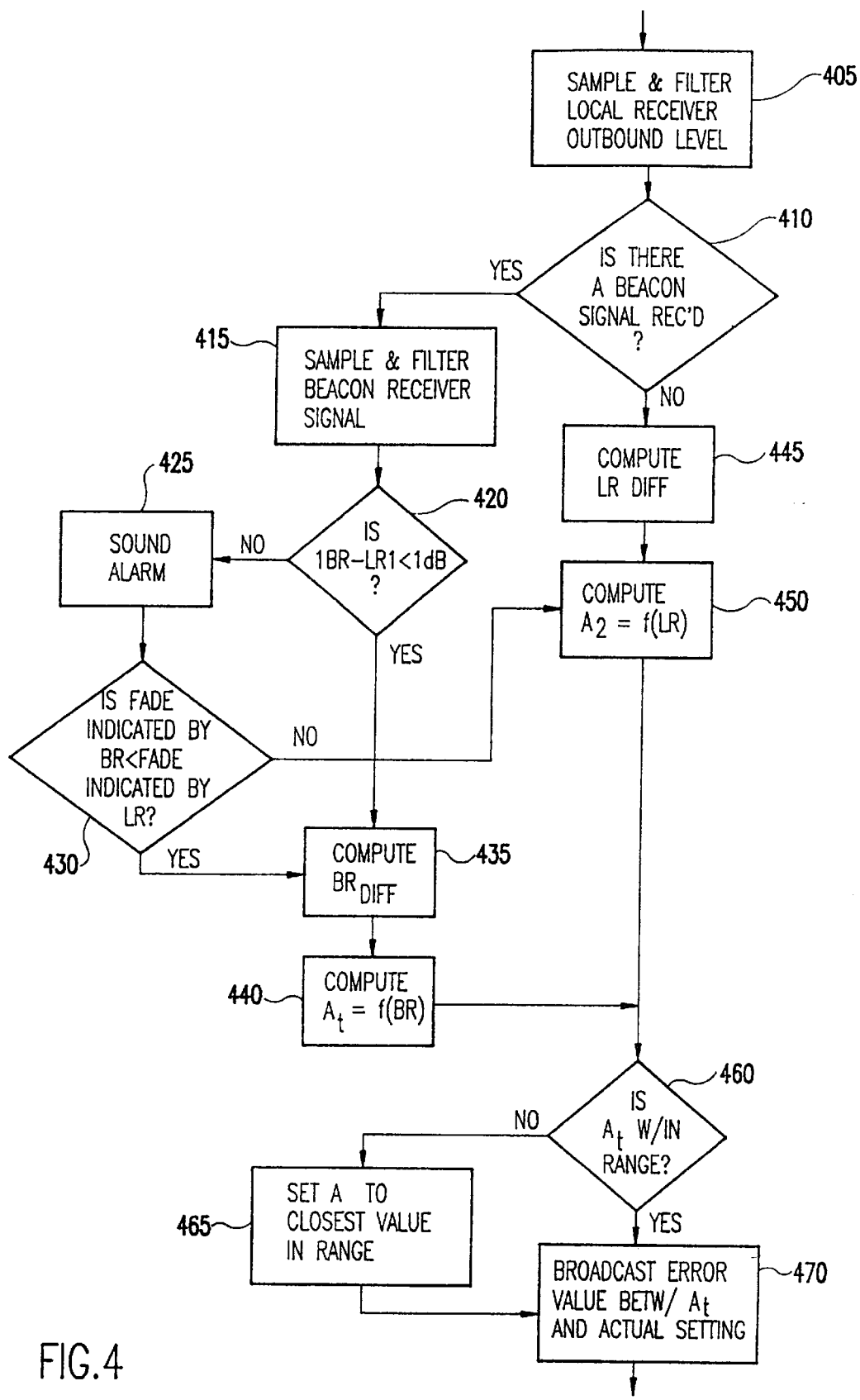
FIG. 4 is a flow chart showing the operation of a sampling interval in an outbound transmission signal power level setting method according to a preferred embodiment of the present invention.

FIG. 4 is a flow chart showing the operation of a sampling interval in the outbound transmission signal power level setting method, according to a preferred embodiment of the present invention. As shown in FIG. 4, the hub 10 begins by sampling the local receiver's outbound power level $LR_t$ and filtering it with an exponential smoothing filter to get a filtered local receiver's outbound power level $LR_t'$ (Step 405).

Then, the hub 10 determines if it is receiving a beacon receiver signal (Step 410). If a beacon receiver signal is received, then the system computes the beacon receiver signal power $BR_t$ and filters it with an exponential smoothing filter to get a filtered beacon receivers signal power level $BR_t'$ (Step 415).

The hub 10 then compares the current sample beacon receiver's measurement of fade with the current sample local receiver's measurement of fade (Step 420). This is a calculation of the current measurement of the drop, in dB, of the beacon signal power, minus the current measurement of the drop, in dB, of the outbound downlink signal power. At this point, it is also necessary to correct for the frequency difference between the outbound downlink signal and the beacon receiver signal to account for the frequency difference (Step 430). If the two differ by more than 1 dB, the system raises an alarm (Step 425) to call the operator's attention to the problem.

After this step, the hub 10 computes the beacon receiver difference $BR_{diff}$ between the nominal beacon receiver level $BR_{nom}$, and the filtered beacon receiver level $BR_t'$, i.e., $BR_{diff}=BR_{nom}-BR_t'$ (Step 435). The system then computes the desired attenuation $A_t$ for the outbound uplink signal 210 as a function of the beacon receiver difference $BR_{diff}$ (Step 440).

If, however, the system determines in step 410 that a beacon receiver signal is not being received, then the system computes the local receiver outbound power difference $LR_{diff}$ between the nominal local receiver outbound power level $LR_{nom}$, and the filtered local receiver's outbound power level $LR_t'$, i.e., $LR_{diff}=LR_{nom}-LR_t'$ (Step 445). In this case, the system computes the desired attenuation $A_t$ for the outbound uplink signal 210 as a function of the local receiver outbound power difference $LR_{diff}$ (Step 450).

Regardless of the path taken, the hub 10 then determines whether the desired attenuation $A_t$ (however calculated) is within a permissible attenuator range for the hub power control attenuator (Step 460). If the desired attenuation $A_t$ is outside of the permissible range, the hub 10 sets the attenuator to the attenuator limit closest to $A_t$ (Step 465).

Finally, the hub 10 broadcasts the value of the error between the desired $A_t$ and the actual attenuator setting, if any (Step 470). The VSATs 20 then use this error value in their inbound power control method.

In step 405, the exponential smoothing filter preferably has the form:

$$LR_t'=\beta*LR_m+(1-\beta)*LR_{t-1}', \qquad (5)$$

where $LR_t'$ is the filter output at sample t, where $\beta$ is a system parameter that may be set between 0 and 1, where $LR_m$ is the current sample measured value, and where $LR_{t-1}'$ is the previous sample filter output.

In step 415 the exponential smoothing filter preferably has the form:

$$BR_t'=\alpha*BR_m+(1-\alpha)*BR_{t-1}', \qquad (6)$$

where $BR_t'$ is the filter output at sample t, where $\alpha$ is a system parameter that may be set between 0 and 1, where $BR_m$ is the current sample measured value, and where $BR_{t-1}'$ is the previous sample filter output; similarly.

In step 440, the desired attenuation $A_t$ is preferably computed according to the following equation:

$$A_t=A_{nom}-[BR_{diff}* 1.2* (f_{OU}/f_{OD})^2] \qquad (7)$$

where $A_t$ is the transmit attenuator setting, using the filtered beacon level measurement, if it is available, where $f_{OU}$ is the outbound uplink frequency and where $f_{OD}$ is the beacon downlink frequency.

In step 450, the desired attenuation $A_t$ is preferably computed according to the following equation:

$$A_t=A_{nom}-[LR_{diff}/(1+0.83*(f_{OD}/f_{OU})^2)] \qquad (8)$$

where $f_{OU}$ is the outbound uplink frequency and where $f_{OD}$ is the outbound downlink frequency.

Once the outbound power level is regulated, it is then necessary to regulate the inbound power level. The VSATs 20 are able to do this efficiently using information provided by the hub 10 in the outbound signal For efficient CDMA-mode operation, the VSAT 20 must implement an inbound power control method in order to keep its inbound $E_b/N_0$, as received by the hub 10, balanced with respect to the received signals from other VSATs 20 in the network. Preferably, the received inbound $E_b/N_0$ (in the absence of multiple-access interference, or MAI) of all the VSATs 20 is kept as close to a target value as possible. This is required in order to keep the inbound block error rates for the VSATs 20 within a nominal operating range. This means that some VSATs 20 may be required to transmit significantly less power (6 dB or so) than they are capable of during clear sky conditions, while others may be required to transmit all the power they can, especially during a rain fade.

For TDMA-mode (non-spread) operation, inbound power control is not as critical as it is for CDMA-mode operation, since only one VSAT 20 transmits on a given frequency at a given time (ignoring collisions), and so there is no need to balance the received $E_b N_0$ levels from multiple VSATs 20. VSATs 20 operating in TDMA-mode networks normally transmit at or near their maximum power level (i.e. at or slightly below P1 dB, the 1 dB compression point of the SSPA) in order to achieve good $E_b/N_0$ margins. However, inbound power control may provide the opportunity to reduce space segment cost in a situation where the inbound link is power-limited (vs. the usual bandwidth-limited situation). Therefore, inbound power control is also preferably implemented in the VSAT network in the TDMA mode.

Figure 5:
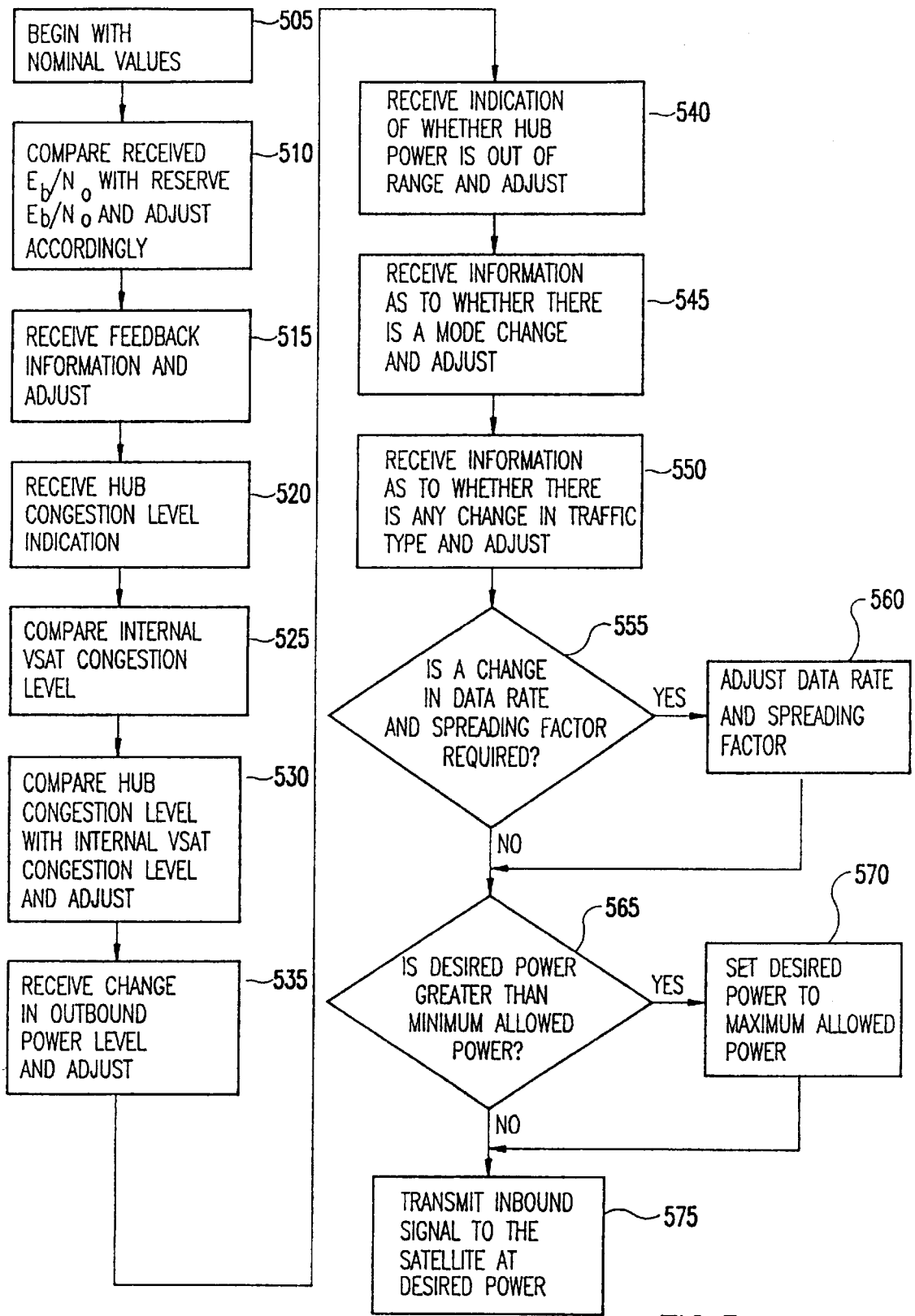
FIG. 5 is a flow chart showing a VSAT inbound uplink power control method according to a preferred embodiment of the present invention.

FIG. 5 is a flow chart showing a VSAT inbound uplink power control method according to a preferred embodiment of the present invention. As shown in FIG. 5, the nominal inbound level is initially set during the commissioning of the VSAT 20, this nominal inbound power level is used as a starting point for determining the actual inbound power level used (Step 505).

The VSAT then computes the difference between a current measurement of the outbound received $E_b/N_0$ level and a reference $E_b/N0$ level determined during commissioning and adjusts the desired inbound power level accordingly (Step 510). If the current outbound $E_b/N_0$ level is lower than the reference $E_b/N_0$ level, then the VSAT 20 must increase the desired inbound power level in accordance with the equation relating the fade at two frequencies (according to equation 1). If the current outbound $E_b/N_0$ level is higher than the reference $E_b/N_0$ level, then the VSAT 20 must decrease the desired inbound power level in accordance with the equation relating the fade at two frequencies.

Feedback of the measured inbound received power level of previous successful inbound bursts is then received from the hub 10 and the desired inbound power level is adjusted accordingly (Step 515). Since the hub demodulators measurement of power level is most accurate when the desired inbound power level is higher than desired, feedback from the hub 10 that the desired inbound power level must be reduced is preferably acted upon immediately. Feedback from the hub 10 that the desired inbound power level should be increased, however, is preferably filtered so as to be acted upon at a slower rate.

The hub 10, through a satellite-modem processor, will keep track of the aggregate retransmission rate from the VSATs 20 and will periodically broadcast a hub congestion level indication signal (Step 520). The VSATs 20 will also determine their own internal VSAT congestion levels by determining their own retransmission rates (Step 525). Upon receiving the broadcast hub congestion level signal, a VSAT 20 will compare its internal VSAT congestion level with the hub congestion level (Step 530), and based on these two measurements, and any difference between them, will adjust its desired inbound power level accordingly.

The VSAT 20 also receives an indication from the hub 10 of any change in the actual outbound power level used as compared to the nominal (clear sky) outbound power level and adjusts the desired inbound power level accordingly (Step 535). The VSAT 20 can thus correct the power level if necessary, based on indication by hub 10 of a change in the nominal (clear sky) outbound power level. Any change so indicated is used to adjust the reference outbound $E_b/N_0$ level determined during commissioning so that the VSAT can determine a proper actual outbound $E_b/N_0$ level for the outbound transmission signal.

The VSAT 20 also receives an indication from the hub 10 as to whether the outbound uplink power control is out of range and adjusts the desired inbound power level accordingly (Step 540). If the hub 10 indicates the outbound uplink power control is out of range, the VSAT 20 will decrease the desired inbound power level by the amount by which the hub indicates the outbound has faded, again, adjusted for frequency.

The VSAT 20 then determines whether there is an operating mode change in the inbound data rate (Step 545). If so, it adjusts the data rate and signal power level accordingly.

The VSAT then determines whether there is a change in the inbound traffic type (Step 550). For example, traffic type may change to voice traffic from data traffic. Some changes in traffic type will bring with them a corresponding need to change the data rate and an associated adjustment to the desired power level The VSAT 20 then determines whether the result of steps 545 and 550 will cause the desired level of the inbound transmission signal to rise above the level at which the VSAT 20 can transmit without exceeding its P1 dB level (Step 555). If so, the VSAT 20 acts to reduce the data rate of the inbound signal by a factor of two and, if operating in CDMA mode, to increase the spreading factor by a factor of two to get 3 dB more $E_b/N_0$ (Step 560). This reduction of the data rate can only be done a limited amount of times, depending upon the design of the VSAT satellite-communication network system.

The VSAT 20 then compares the desired inbound power level with a maximum inbound power level at which the VSAT 20 can transmit (Step 565). If the desired inbound power level exceeds the maximum inbound power level by more than a predetermined amount, then the desired inbound power level is reset to the maximum power level (Step 570).

Finally, the VSAT 20 transmits the inbound uplink signal to the satellite 30 using the desired inbound power level as an actual inbound power level (Step 575).

A more detailed description of these individual steps for the preferred embodiment of the present invention is shown as follows.

As shown above in step 505, the nominal inbound power level that the VSAT 20 will transmit is initially set during an installation or commissioning procedure. During this procedure, the hub 10 will command the VSAT 20 to transmit a continuous wave (CW) signal. The hub 10 will then command the VSAT 20 to increase its power level in small steps from a minimum until the hub determines that the VSAT solid-state power amplifier (SSPA) has gone one dB into compression, i.e, until it reaches the P1 dB level. The P1 dB level is the point at which the output power level of the SSPA falls one decibel below the expected output power level based on the gain of the SSPA in a linear operation mode. The P1 dB level is determined by increasing the input power to the SSPA in 1 dB steps from a point at which the SSPA is known to operate in a linear mode, and noting the point at which the output power level reaches a level one decibel below the expected output level. This final output level is called the P1 dB level.

The hub measures the inbound carrier level using a spectrum analyzer (or other suitable receiver). Upon completion of this measurement process, the hub 10 will tell the VSAT 20 what nominal inbound power level to use and at what level the SSPA went into compression. This process can be performed manually or automatically.

The inbound link power adjustment process should be avoided if the hub 10 is experiencing a rain fade that exceeds the ability of the hub uplink power control mechanism to overcome. This situation should be relatively brief in duration. The VSAT 20 also stores the received downlink outbound $E_b/N_0$ level that it measures during the inbound power adjustment process, as well as the hubs indication of its outbound power level (Step 530). This will allow the VSAT 20 to compensate for a satellite-to-VSAT rain fade that may have been in progress during the commissioning process.

As shown in step 510, the VSAT 20 receives outbound $E_b/N_0$ values, compares a current measurement of the $E_b/N_0$ value of the outbound received signal with a reference $E_b/N_0$ value determined during commissioning. The VSAT 20 then adjusts the desired inbound power level accordingly. In this procedure, changes in the received outbound $E_b/N_0$ level are measured by the VSAT RF modem demodulator circuits, and are available immediately and on a continuous basis (assuming the VSAT is locked to the downlink outbound signal). The VSAT RF modem's measurement of the outbound $E_b/N_0$ will have an accuracy that is dependent on the actual $E_b/N_0$ level—the higher the actual $E_b/N_0$, the more accurate the measurement will be.

In the preferred embodiment, the outbound $E_b/N_0$ measurements will be updated by the VSAT RF modem at about a 1 Hz rate. These measurements should preferably be sampled (read) at constant intervals, preferably in the range of one to ten seconds (set as a system parameter) and then filtered by a exponential smoothing filter, preferably of the form:

$$(E_b/N_0)'_t = \kappa *(E_b/N_0)_m + (1-\kappa)*(E_b/N_0)'_{t-1} \tag{9}$$

where $(E_b/N_0)'_t$ is the filter output at sample t, $\kappa$ is a system parameter that may be set between 0 and 1, $(E_b/N_0)_m$ is the current sample measured value, and $(E_b/N_0)'_{t-1}$ is the previous sample filter output.

As shown in step 515, changes in the VSAT's received inbound power level are measured by the hub demodulator 305, and are only available following a successful burst transmission from the VSAT 20, and are made available to the VSAT 20 only after hub processing and queuing delays and the propagation delay from the hub 10 back to the VSAT 20. The accuracy of the hub demodulator's measurement of the inbound burst power is a function of the actual power during the burst, the number of interfering signals, the spreading ratio if CDMA is used, and other factors. The higher the actual inbound burst power, the lower the number of interfering signals, and the higher the spreading ratio, the more accurate the hub demodulators measurement will be.

The inbound burst power has to be measured by each hub demodulator 305 in the system. The IF signal distribution mechanism may introduce small (±1 dB) differences in the IF signal levels reaching each hub demodulator 305 in the system. Therefore, there is a mechanism for calibrating the hub demodulators 305 so that when they are given an IF signal, they will all measure the same power level for that signal. One possible mechanism is to periodically transmit a burst from a local test transmitter in a reserved time slot, and to configure all the hub demodulators 305 that can receive that burst to measure and report the power level of the burst.

Also, since the system measures inbound power level, and since this power level will be a function of the hub-to-satellite rain fade, the inbound power level measured by the hub demodulators needs to be corrected to remove errors introduced by this rain fade. The measurement of inbound rain fade is normally provided by the beacon receiver 310 or the hub local receiver unit 315 through 325. Correction for the frequency difference between the inbound frequency and the beacon frequency or outbound frequency can be accomplished as previously described.

Each hub satellite-modem processor preferably maintains estimates of inbound power both for the whole population of VSATs managed by it and for each individual VSAT 20. These estimates will be based on each and every measurement. Exponential smoothing is preferably used to filter the results. Note that different smoothing parameters are appropriate for an individual VSAT 20 versus all of them together. That is, there are two different smoothing parameters involved: one for use in filtering the measurements for individual VSATs, 20 and one for all of the VSATs 20 combined.

For each packet received, the hub satellite-modem processor updates the aggregate estimate for inbound power level using the aggregate smoothing parameter, and it updates the inbound power level estimate for the VSAT 20 involved using the smoothing parameter for filtering individual VSAT's 20 inbound power level. When the estimated inbound power level for a VSAT 20 rises or drops below the estimate for all the VSATs 20 by a configurable amount (about one dB), the hub satellite-modem processor sends a message to the VSAT 20 involved instructing it to decrease or increase its power level by a configurable amount.

If the feedback from the hub 10 indicates that the VSAT's power level should be increased, it should be filtered so that it takes effect at a slower rate. An appropriate and preferred filter is of the form:

$$P'_t = \lambda * P_m + (1-\lambda)*P'_{t-1} \tag{10}$$

where $P'_t$ is the next power level to transmit, $P_m$ is unfiltered estimate of the correct power to transmit, $\lambda$ is a TBD constant ($0<\lambda<1.0$), and $P'_{t-1}$ is the previous filter output.

As shown in steps 520 and 525, the inbound link is designed to experience some block error rate, during peak traffic conditions, assuming the $E_b/N_0$ is at the nominal level. If the $E_b/N_0$ drops, the block error rate will increase. If an inbound burst suffers an error, the VSAT 20 will have to retransmit the burst, or a portion thereof. The VSAT 20 will be able to determine its own retransmission rate very easily. However, an inbound burst can suffer an error due to a collision as well as due to a low signal level. Therefore, the VSAT 20 must keep two retransmission statistics—one for random Aloha (contention) transmissions, and one for reservation mode (non-contention) transmissions. The hub will transmit a contention level indication. If, in Aloha mode, the hub 10 is indicating a congestion level exists when the VSAT 20 is having to retransmit frequently, the rate at which the VSAT 20 increases its power should be reduced. If the VSAT 20 is having to retransmit frequently for bursts sent during reservation slices or when the hub 10 is indicating very low levels of congestion, the rate at which the VSAT 20 increases its power should be increased.

There will be several (typically eight, and possibly as many as 16) different "congestion levels" that designate bands of Aloha retransmission rates (as measured by the hub satellite-modem processor) that are specified by an array of retransmission rate boundaries between 0.0 and 1.0. Normally, these boundaries will be roughly evenly spaced.

The actual retransmission rate measurements should be done both by the VSATs 20 and by the hub satellite-modem processor. In the preferred embodiment, the hub satellite-modem processor only measures the aggregate retransmission rate, not individual retransmission rates for each VSAT 20. This is because the VSATs 20 can measure their retransmission rates more accurately than the hub satellite-modem processor can.

Instead of measuring retransmission rate directly, the preferred embodiment of the present invention measures the average number of transmission attempts per successful transmission. Then it uses exponential smoothing (with different configurable parameters for the VSAT 20 measurements and the hub satellite-modem processor measurements) to filter the series of measured values.

Basically, the hub satellite-modem processor sends a broadcast message to all its VSATs 20 declaring the new congestion level whenever its filtered estimate of the retransmission rate crosses a boundary from one level to the next. Such broadcasts should be suppressed if they occur within a configurable minimum interval since the most recent congestion level broadcast messages. A maximum congestion level change should also be imposed to prevent, for example, jumping from congestion level two to level seven.

As shown in step 530, the VSAT's 20 measurements of their own "congestion levels" are compared to the congestion levels broadcast by the hub satellite-modem processor to serve as the basis for adjustments to the VSAT uplink power level. Whenever a VSAT 20 estimates that its retransmission rate is in a band that is more than one congestion level different from the latest broadcast congestion level, the VSAT 20 should increase or decrease its power by a configurable amount. The amount of these power adjustments would normally be appropriate for changing the VSATs retransmission rate to the middle of the congestion level that's the nearest neighbor of the broadcast congestion level. That is, we do not want to fully compensate for the VSAT's retransmission rate variance from the aggregate retransmission rate, only to adjust its power to get close to the average retransmission rate for all of the VSATs 20. Also, VSATs 20 should not adjust their power levels by more than a configurable amount, and they should not adjust their power levels more often than a configurable time interval.

In step 530, exponential smoothing is preferably employed both by the hub satellite-modem processor on the aggregate congestion level and by the VSAT on its own retransmission rate.

If practical, the VSAT power level should be increased above the level for initial attempts for all retransmissions. These power adjustments should be a small configurable amount, possibly about 0.5 dB.

As shown in step 535, the hub 10 will broadcast the nominal power level at which it is transmitting the outbound carrier on a periodic (and frequent) basis. If the nominal hub outbound power level is increased or decreased either for availability reasons or due to an outbound link rate change, this allows the VSAT 20 to determine whether a change in the outbound $E_b/N_0$ is due to a rain fade or due to a change in the nominal level the hub 10 is transmitting. For example, if the hub outbound power level is intentionally decreased, the VSATs 20 will see a reduction in the outbound $E_b/N_0$, which would otherwise indicate a rain fade is in process. This would cause all of the VSATs 20 to increase their inbound levels to compensate for the perceived rain fade. But if the hub 10 broadcasts the power level setting, the VSATs can determine that the change in $E_b/N_0$ is due to an intentional outbound level change, and not due to a rain fade.

As shown in Step 540, when the hub 10 is experiencing a hub-to-satellite rain fade, it will increase its power output to compensate for the rain fade. If the rain fade is very severe, the power increase required to overcome it may exceed the capability of the hub 10 to increase its power. In this case, the outbound $E_b/N_0$ level received by the VSAT 20 will drop even when there is no rain fade between the satellite 30 and the VSAT 20. The hub shall therefore broadcast an indication of the estimated amount of reduction of downlink outbound signal power as transmitted by the satellite 30. This will allow the VSATs 20 to determine that the resultant reduction in received outbound $E_b/N_0$ is due to an outbound power control error, and not due to a rain fade at the VSAT 20.

As shown in steps 545 through 560, there are two operating mode changes that may require the VSAT 20 to change its inbound power level: an inbound data rate change, and an inbound traffic type change.

Normally, if the VSAT decreases or increases its data rate by a factor of two or four, it should decrease or increase its power level by a factor of 3 or 6 dB, respectively. However, in CDMA mode, during a severe satellite-to-VSAT rain fade (for example), the VSAT could reduce its inbound data rate by a factor of two, while increasing its spreading factor by two and maintaining its inbound power level the same, to effect a 3 dB increase in its transmitted $E_b/N_0$, while also increasing its signals processing gain by two and maintaining a constant inbound bandwidth. In the preferred embodiment, this can be done two times for a maximum $E_b/N_0$ increase of 6 dB in the transmitted $E_b/N_0$ and a maximum increase in the signal processing gain of 4.

The inbound block error rate that corresponds to the received inbound $E_b/N_0$ operational setpoint may be at a level that is acceptable for routine data traffic, but is unacceptable for voice traffic, which typically requires a low block error rate without retransmissions for useful communications. In a network carrying mainly data traffic with occasional voice traffic, the inbound data rate for data traffic might be 32, 64, or 128 kbps (nominally). However, for voice traffic alone, 16 kbps will suffice. This makes it possible to reduce the data rate for a VSAT 20 handling voice-type traffic by a factor of two or four. If the VSAT inbound channel is operating in CDMA mode, the VSAT 20 can increase its spreading factor in inverse proportion to keep the chipping rate and hence the bandwidth of its inbound signal the same. If the inbound power level stays the same, the $E_b/N_0$ of the VSAT 20 with the reduced data rate will increase according to the equation:

$$10 \log\left(\frac{R_D}{R_V}\right) \qquad (11)$$

where $R_D$ is the inbound data rate of the data traffic VSATs 20, and $R_V$ is the inbound data rate of the voice traffic VSAT(s) 20.

As shown in Steps 565 and 570, the VSAT system has a maximum allowed inbound power level. This maximum level is measured by the hub 10 and recorded by the VSAT 20 during installation and commissioning. If it is exceeded, the VSAT inbound spectrum will begin to exhibit unacceptable sidelobes.

What is claimed is:

1. A method for adjusting the power in an uplink transmission from a hub earth-station to a satellite, the method comprising the steps of:

receiving an outbound signal from a local receiver, and determining an outbound signal power level;

conditionally receiving a beacon signal from a satellite local receiver and determining a beacon signal power level;

computing a first difference between the received beacon signal power level and a nominal beacon signal power level, when the beacon signal is received;

computing a second difference between the received outbound signal power level and a nominal outbound signal power level, when the beacon signal is not received;

computing a desired amount of attenuation based on the first difference if the beacon signal is received and the second difference if the beacon signal is not received;

determining whether the desired amount of attenuation is within a range of permissible amounts of attenuation; and setting an actual amount of attenuation with a value within the range of permissible amounts of attenuation if the desired amount of attenuation is outside of the range of permissible amounts of attenuation.

2. A method for regulating the power of an inbound signal sent from a VSAT earth-station to a hub earth-station, the method comprising the steps of:

receiving an outbound signal sent from the hub earth-station to the VSAT earth-station the outbound signal including signal data and parameter data;

determining signal properties of the received outbound signal; and modifying the inbound transmission signal based on the parameter data, the signal properties, and reference data, wherein:

the signal properties include the ratio of received energy per bit to the noise density for the outbound signal, the reference data includes a reference ratio of received energy per bit to the noise density, and the step of modifying the inbound transmission signal operates based on a comparison of the ratio of received energy per bit to the noise density for the outbound signal compared to the reference ratio of received energy per bit to the noise density.

3. A method for regulating the power of an inbound signal, as recited in claim 2, wherein the ratio of received energy per bit to the noise density for the outbound signal is determined by sampling and filtering the outbound signal.

4. A method for regulating the power of an inbound signal, as recited in claim 3, wherein filtering is an exponential smoothing filter of the form:

$$(E_b/N_0)'_t = \kappa * (E_b/N_0)_m + (1-\kappa) * (E_b/N_0)'_{t-1}$$

where $(E_b/N_0)'_t$ is a filter output at sample time t, $\kappa$ is a system parameter set between 0 and 1, $(E_b/N_0)_m$ is a current sample measured value, and $(E_b/N_0)'_{t-1}$ is a previous filter output at sample time (t-1).

5. A method for regulating the power of an inbound signal, as recited in claim 3, wherein the step of modifying the inbound transmission signal operates substantially immediately if it lowers the inbound signal's power level, and the step of modifying the inbound transmission signal operates according to a delay if it increases the inbound signal's power level.

6. A method for regulating the power of an inbound signal, as recited in claim 5, wherein the delay is caused by the use of a filter of the form:

$$P'_t = \lambda * P_m + (1-\lambda) * P'_{t-1}$$

where $P'_t$ is a next power level to transmit, $P_m$ is an unfiltered estimate of a correct power to transmit, $\lambda$ is a configurable parameter ($0 < \lambda\_ < 1.0$), and $P'_{t-1}$ is a previous filter output.

7. A method for regulating the power of an inbound signal sent from a VSAT earth-station to a hub earth-station, the method comprising the steps of:

receiving an outbound signal sent from the hub earth-station to the VSAT earth-station, the outbound signal including signal data and parameter data;

determining signal properties of the received outbound signal; and modifying the inbound transmission signal based on the parameter data, the signal properties, and reference data, wherein the parameter data includes information regarding a previous inbound power level of a previous inbound signal.

8. A method for regulating the power of an inbound signal sent from a VSAT earth-station to a hub earth-station, the method comprising the steps of:

receiving an outbound signal sent from the hub earth-station to the VSAT earth-station, the outbound signal including signal data and parameter data;

determining signal properties of the received outbound signal;

modifying the inbound transmission signal based on the parameter data, the signal properties, and reference data, determining internal VSAT congestion information; and modifying an inbound transmission signal based on the internal VSAT congestion information and the hub congestion information, wherein the parameter data includes hub congestion information, and wherein the step of modifying the inbound transmission signal uses aggregate congestion information calculated by comparing the hub congestion information with the internal VSAT congestion information.

9. A method for regulating the power of an inbound signal, as recited in claim 8, wherein the step of modifying the inbound transmission signal uses exponential smoothing.

10. A method for regulating the power of an inbound signal sent from a VSAT earth-station to a hub earth-station, the method comprising the steps of:

receiving an outbound signal sent from the hub earth-station to the VSAT earth-station, the outbound signal including signal data and parameter data;

determining signal properties of the received outbound signal; and modifying the inbound transmission signal based on the parameter data, the signal properties, and reference data;

determining whether a desired inbound signal power is greater than a maximum allowed inbound signal power; and setting an actual inbound signal power equal to the maximum allowed inbound signal power if the determining step determines that the desired inbound signal power is greater than the maximum allowed inbound signal power.

* * * * *